US006708292B1

(12) United States Patent
Mangasarian

(10) Patent No.: US 6,708,292 B1
(45) Date of Patent: Mar. 16, 2004

(54) SYSTEM, METHOD AND SOFTWARE FOR PROTOCOL ANALYZER REMOTE BUFFER MANAGEMENT

(75) Inventor: Jeff Mangasarian, El Granada, CA (US)

(73) Assignee: Network Associates, Inc., Santa Clara, CA (US)

( * ) Notice: Subject to any disclaimer, the term of this patent is extended or adjusted under 35 U.S.C. 154(b) by 679 days.

(21) Appl. No.: 09/640,767

(22) Filed: Aug. 18, 2000

(51) Int. Cl.⁷ .............................................. G06F 11/00
(52) U.S. Cl. ............................ 714/39; 714/4; 709/224
(58) Field of Search .................. 714/4, 39, 43; 709/224

(56) References Cited

U.S. PATENT DOCUMENTS

| | | | | |
|---|---|---|---|---|
| 6,064,304 A | * | 5/2000 | Arrowsmith et al. | 340/506 |
| 6,275,957 B1 | * | 8/2001 | Novik et al. | 714/39 |
| 6,314,533 B1 | * | 11/2001 | Novik et al. | 714/39 |
| 6,332,202 B1 | * | 12/2001 | Sheikh et al. | 714/39 |
| 6,560,723 B1 | * | 5/2003 | Matsui | 714/39 |

OTHER PUBLICATIONS

Providing Total Network Visibility—Brochure from Network Associates, Inc.
Sniffer for e–business—©2000 Networks Associates Technology, Inc.—Jan. 2000.
Full Duplex Analysis for Sniffer Pro LAN—©1999 Networks Associates Technology, Inc.—Jun. 1999.
Distributed Sniffer System/RMON Server—©1999 Networks Associates Technology, Inc.—Jun. 1999.
Distributed Sniffer System—©2000 Networks Associates Technology, Inc.—Jun. 11, 2000.

* cited by examiner

*Primary Examiner*—Scott Baderman
*Assistant Examiner*—Joshua Lohn
(74) *Attorney, Agent, or Firm*—Christopher J. Hamaty; Swidler Berlin Shereff Friedman, LLP

(57) ABSTRACT

A method and system for gathering data by monitoring data packets on a network. At least some of the packets are captured in a data buffer. Each captured packet is classified according to a preselected classification system and each captured packet is marked with an indicia of its classification. An analysis program is executed on a network coupled computer. The analysis program displays data about the buffer contents including the indicia before transferring the buffer contents to the analysis program.

16 Claims, 4 Drawing Sheets

SYSTEM, METHOD AND SOFTWARE FOR PROTOCOL ANALYZER REMOTE BUFFER MANAGEMENT

BACKGROUND OF THE INVENTION

1. Field of the Invention

The present invention relates, in general, to protocol analyzer systems, and, more particularly, to software, systems and methods for remotely managing protocol analyzer data buffers.

2. Relevant Background

Protocol analyzers are tools used to monitor, troubleshoot, and manage data networks. Data networks are used to conduct data traffic, usually in the form of data packets, between network connected devices. A protocol analyzer, also called a "sniffer", is coupled to the data network and monitors all network data traffic. Protocol analyzers typically include filters that specify selection criteria for packets such as type, size, source node identification, destination node identification, and the like. Network packets that meet specified criteria are identified and logged for later analysis.

Businesses and individuals are increasingly reliant on data networks to improve productivity and add value to the computing devices that use the data network. The devices coupled to networks are increasingly heterogeneous and may use a variety of protocols over a single physical network. Further, businesses increasingly employ multiple networks of different types. These factors increase the difficulty and importance of network management.

A complex network comprises a plurality of segments where each segment is roughly equivalent to a local area network (LAN). Segments are coupled together by internetwork technologies such as wide area network (WAN) systems using, for example, the public switched telephone network (PSTN) to internetwork segments. The quantity of data transported across a typical network and the rate at which that data is transported create a formidable data management problem for protocol analysis systems. Data packets must be captured from the network traffic, filtered, and logged by dedicated hardware physically coupled to the network segment under study. Logs taken over even a short period of time can result in megabytes or gigabytes of data stored in the protocol analyzer's buffer.

As networks become more complex, it is desirable to perform many network management functions remotely in a centralized fashion. In a complex network, effective protocol analysis at the segment level requires a distributed solution in which a protocol analyzer is coupled to each network segment to be analyzed. However, the analysis operations are most efficiently implemented in a centralized manner so that a single host can access data from any given segment for analysis. Remote management may be performed over long distances, or may simply involve managing a first network from a management console attached to a second network. Remote management avoids the difficulty and inefficiency associated with a requirement that the management tool be physically connected to the network to be managed.

In a distributed analyzer, a remote probe is coupled to the network to be managed while the analysis and display software are executed in a host computer. The host computer includes. network connection mechanisms to couple to the remote probe and download data from the remote probe using, for example, remote monitor (RMON) standard protocols. The remote probe includes high-speed hardware for capturing packets and storing them in a buffer or data file within the analyzer. The remote probe also includes large amounts of physical storage for holding the captured packets.

However, the massive quantity of data captured in a typical environment creates a significant obstacle in remote management. The captured data must be transported from the remote probe to the host machine. In the past this transport has been performed by out of band communication links or slowly transporting it over the networks and internetwork(s) connecting the probe and the host. However, the time required to transport this data is unacceptable and the transport adversely affects network performance while the captured data is moving through the networks. A need exists for systems, methods and software to more efficiently transport probe data gathered by a remote protocol analyzer probe.

Moreover, the amount of working memory (e.g., random access memory or "RAM") in a typical host analysis computer is a fraction of the size captured by the remote buffer. Even if the entire probe buffer contents could be efficiently transported to the host, the host tends to struggle in manipulating and analyzing files larger than its available working memory. A need exists for a mechanism that enables a user to specify only a portion of a probe buffer that can be efficiently manipulated by the host computer.

SUMMARY OF THE INVENTION

Briefly stated, the present invention involves a method and system for gathering data by monitoring data packets on a network. At least some of the packets are captured in a data buffer. Preferably, each captured packet is classified according to a preselected classification system and each captured packet is marked with an indicia of its classification. An analysis program is executed on a network coupled computer. The analysis program displays data about the buffer contents, including the indicia when available, before transferring the buffer contents to the analysis program. A user of the analysis program can select portions of the buffer contents for transfer as an alternative to transferring the entire buffer contents.

In another aspect, the present invention involves a probe buffer for capturing data packets from a network. Filter routines executing in the probe operate to receive packets from the network and select packets meeting predefined criteria. Classification routines operable in cooperation with the filter routines to associate a class code with each of the selected packets. A packet buffer has a plurality of entries where each entry is sized to hold a captured packet. A class tracking buffer has a plurality of entries where each entry corresponds with an entry in the packet buffer and holds the class code associated with the packet held in the corresponding packet buffer.

DETAILED DESCRIPTION OF THE PREFERRED EMBODIMENTS

Figure 1:
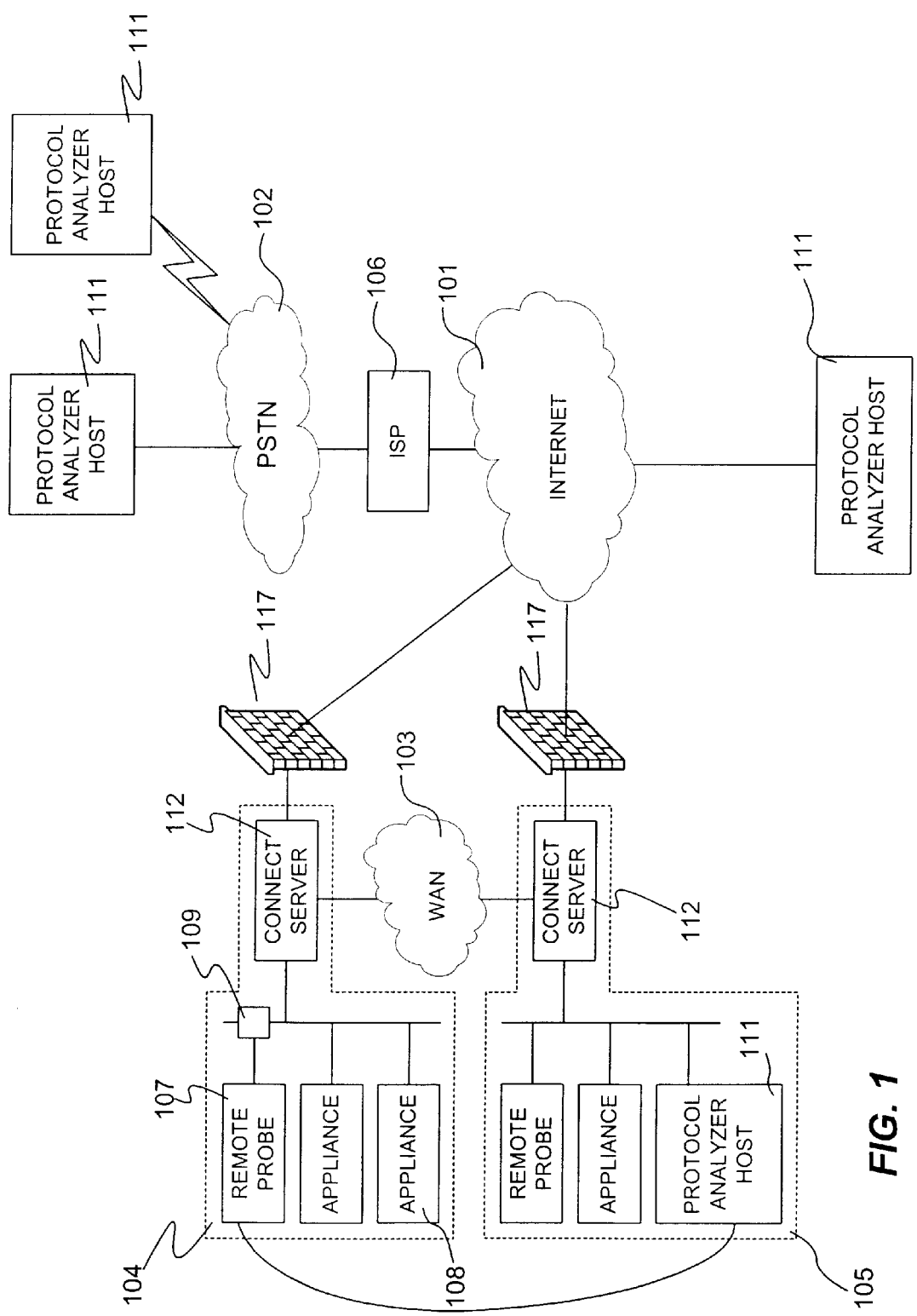
FIG. 1 shows a networked computer environment in which the present invention is implemented.

The present invention generally involves systems, methods, and software enabling a host computer 111, shown in FIG. 1, to upload captured network packets from a network probe 107. The host computer memory availability may be less than the size of the probe buffer so that the host does not upload the entire set of packets from the probe. The present invention enables a user to specify and select which contents of the probe buffer are uploaded to enable efficient data uploading and manipulation.

The present invention provides a user interface that enables a user to specify which packet index to start an upload from and the size of the upload. The size of the upload is selected to be consistent with the amount of available working memory on the host computer 111. optionally, the present invention enables a user to intelligently upload packets of interest by pre-communicating packet classification data to the user before the upload occurs.

The present invention is illustrated and described in terms of a distributed computing environment such as an enterprise computing system using public communication channels such as the Internet and/or the public switched telephone network. However, an important feature of the present invention is that it is readily scaled upwardly and downwardly to meet the needs of a particular application. Accordingly, unless specified to the contrary the present invention is applicable to significantly larger, more complex network environments as well as small network environments such as conventional LAN systems.

FIG. 1 shows a distributed protocol analysis system including a variety of internetworking components such as Internet 101, public switched telephone network (PSTN) 102, and a wide area network (WAN) 103. The distinct internetwork designations shown in FIG. 1 provide an accurate conceptual model and are provided for ease of description and understanding. In practice, Internet 101 may include components of both PSTN 102 and WAN 103. Likewise, WAN 103 is often implemented using PSTN 102 and/or Internet 101.

A first network segment 104 and a second network segment 105 are interconnected using Internet 101 and/or WAN 103 in a typical fashion. Network segments 104 and 105 are usefully thought of as local area networks (LANs) although either or both may represent only a portion of a LAN in a given network's topology. The present invention is readily adapted for both client/server and peer-to-peer type networks as well as hybrid topologies. Network segments 104 and 105 comprise copper, optical, wireless and/or other available physical connection technologies.

LANs 104 and 105 implement physical and logical communications links between a number of network appliances 108. One or more network appliances 108 may be configured as an application and/or file server. Network appliances 108 include, for example, computers, printers, file servers, mass storage and the like. Similarly, appliances 108 may be shared through network 101 to provide application and file services, directory services, printing, storage, and the like remotely.

Network appliances 108 may be implemented as any kind of network appliance having sufficient computational function to execute software needed to establish and use a connection to network 101 and/or WAN 103. Network appliances 108 may comprise workstation and personal computer hardware executing commercial operating systems such as Unix variants, Microsoft Windows, Apple OS, and the like. Other appliances 108 comprise portable or hand held devices such as personal digital assistants and cell phones executing operating system software such as PalmOS, WindowsCE, and the like. Moreover, the present invention is readily extended to network devices such as office equipment, vehicles, and personal communicators that make connections through network 101.

Connect servers 112 provide and manage a physical connection between the various devices through network 101. Firewalls 117 implement desired access and security protocols to manage access through network 101. Connect servers 112 and firewalls 117 may be implemented in separate or common computer hardware. Often, connect server 112 and firewall 117 are implemented as software programs executing on a network appliance 108 such as an application server, connection server, or router.

Network appliances 108 may also couple to network 101 through public switched telephone network 102 using copper or wireless connection technology. In a typical environment, an Internet service provider (ISP) 106 supports a connection to network 101 as well as PSTN 108 connections to network appliances 109.

Each of the devices shown in FIG. 1 may include memory, mass storage, and a degree of data processing capability sufficient to manage their network connection(s) or to manage a connection to an external device that is itself connected to network 101, PSTN 102 and/or WAN 103. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm (not shown) that provides mass storage capacity beyond what an individual device can efficiently use and manage. Selected components of the present invention may be stored in or implemented in shared mass storage.

In FIG. 1 both network segments 104 and 105 include a remote probe 107. Remote probe 107 may be permanently or temporarily coupled to its associated network segment. Remote probe 107 in network segment 104 is coupled using a passthrough device 109. Remote probe 107 in network segment 105 is directly coupled as a node on the network. Depending on the network topology and physical implementation, a passthrough device 109 may be-desired to ensure network functionality in the event a remote probe 107 becomes dysfunctional. Remote probes 107 typically include one or more processing units, memory, mass storage, and software configured to monitor network traffic and capture all or selected portions of the monitored traffic.

A number of protocol analyzers 111 are shown with various network connectivity modes. It should be understood that the present invention is particularly useful in a centralized network management system which may have only one protocol analyzer 111 operating at any given time. A single protocol analyzer 111 may access the data on both network segments 104 and 105. The ability to manage multiple network segments is particularly useful in that it enables analysis of conditions that are related to multiple network segments. The variety of analyzers 111 shown in FIG. 1 convey the variety of connection modes made practicable by the present invention. Protocol analyzers 111 typically include one or more processing units, memory, mass storage, and software configured to program remote probes 107 and retrieve all or selected portions of the captured traffic.

Remote probe 107 will store up to gigabytes of data obtained from a typical capture session. This captured data must be managed after it is captured by a protocol analyzer host 111. The present invention provides efficient mechanisms to transfer data, metadata, and control information between analyzer host 111 and remote probe 107.

Figure 2:
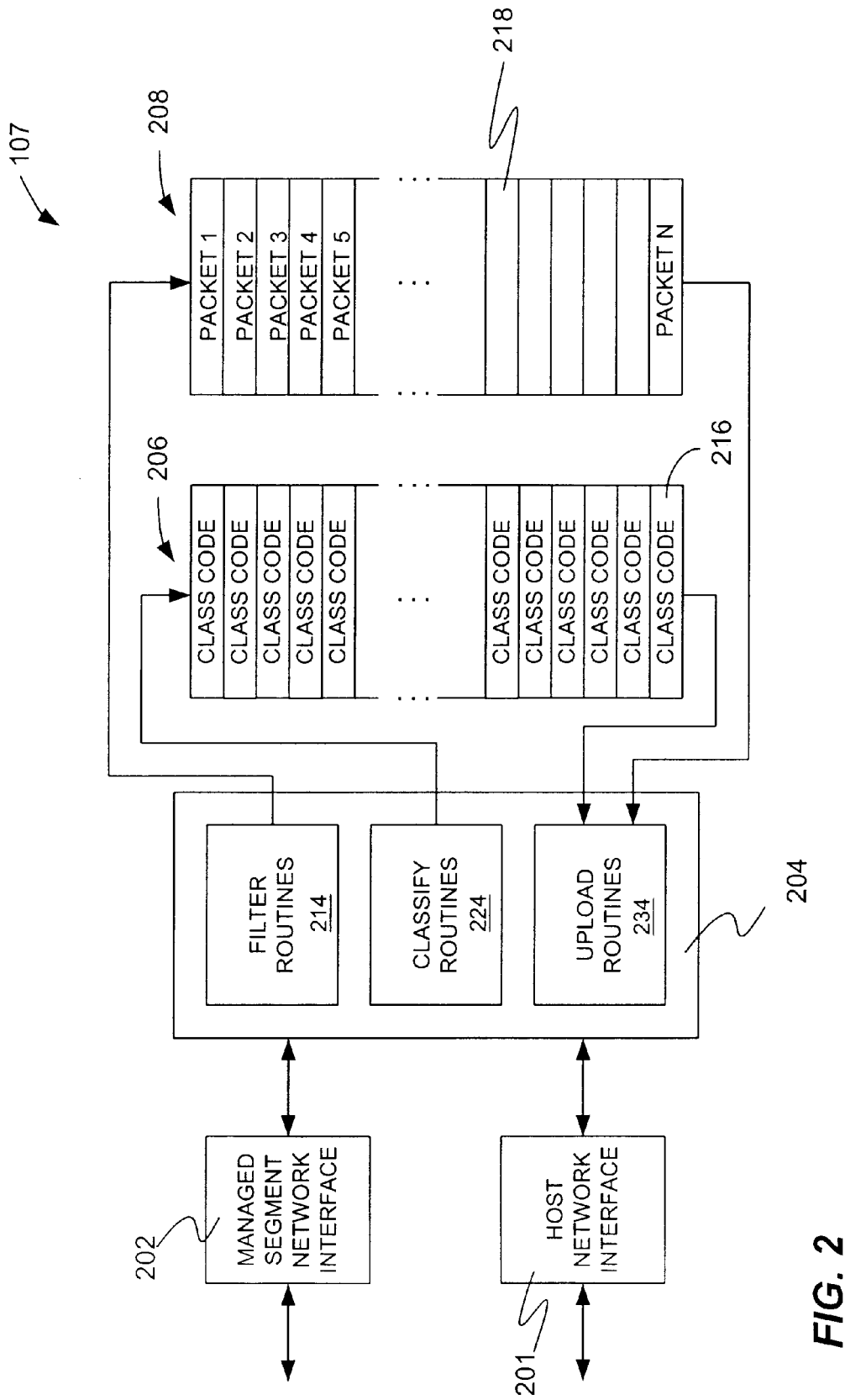
FIG. 2 shows a remote probe in accordance with the present invention in functional block diagram form.

FIG. 2 illustrates components of a probe 107 in accordance with the present invention. Network communication is enabled by network interfaces 201 and 202 which may be implemented as a single network interface card or as separate network interface cards with appropriate driver software (not shown) executing in probe processor 204. Interface 201 supports communication with one or more hosts 111 shown in FIG. 1. Interface 202 is coupled to the managed network segment (e.g., segments 104 and/or 105) so as to monitor all network traffic of interest. Interface 202 may include local data processing and buffer memory to enable packet capture at network data transfer rates.

Probe processor 204 executes filter routines 214, classify routines 224 and upload routines 234 among other programs. Probe processor 204 comprises, for example, a Pentium-class microprocessor having memory and/or mass storage for holding both data and program code used to implement routines 214, 224 and 234.

Program code in the form of executable code, scripts, applets, or the like describing filter routines 214 and classification routines 224 is generated on a host 111. Routines 214 and 224 are downloaded to probe processor 204 via host network interface 201. Alternatively, routines 214 and 224 may be pre-installed and permanently stored in processor 204. In a preferred implementation, filter routines 214 and classification routines 224 comprise a first code component stored in processor 204 that is customized by downloading parameters and/or code components to implement specific filters and classification operations.

Filter routines 214 describe packet selection criteria that enable only selected packet types to pass into packet buffer 208. Filter routines 214 are configurable to discriminate between packets based on any criteria that can be read from a data packet including both header information and content information. Classify routines 224 operate in similar manner by examining the data packets that are passing through filter routines 214 and based on the packet header and/or data generates a classification code associated with the packet. Both filter routines 214 and classification routines 224 may be merged into a single software module that both filters and generates class codes. The generated classification codes are stored in packet class tracking buffer 206.

Packet buffer 208 includes an entry 218 for every stored packet. Each entry 218 contains a sufficient number of bits to hold an entire packet, which may vary from implementation to implementation based on the width of a particular packet. In an exemplary implementation packet buffer 208 comprises 256K entries 218 with each entry 218 being 512 bytes wide.

Class tracking buffer 206 includes an entry 216 for every stored packet thereby making a one-to-one association between a class entry 216 and a buffer entry 218. Each entry 216 contains a sufficient number of bits to hold a class code, which may vary from implementation to implementation based on the number of classifications. In an exemplary implementation packet buffer 208 comprises 256K entries 218 with each entry 218 being three bits wide. Three bits provides for definition of up to eight different classifications. The present invention is readily extended to implement a larger number of classifications with a predictable impact on total memory resources needed for tracking buffer 206.

Upload routines comprise routines used to communicate class codes 216 and packet buffer entries 218 to host 111. In operation, host 111 requests class code information from tracking buffer 216 before downloading the sizable content stored in packet buffer 208. Host 111 then uses the class information to enable intelligent selection of portions of packet buffer 208 to be downloaded. This greatly reduced the volume of data transferred in many cases. Alternatively, upload routines 234 may include data processing routines that perform analytic and/or statistical operations on packet buffer entries 218 followed by uploading the operation results rather than the packet buffer entries 218 themselves. In such an implementation upload routines 234 are programmed via a host 111 in a similar manner to filter routines 214 and class routines. 234.

Figure 3:
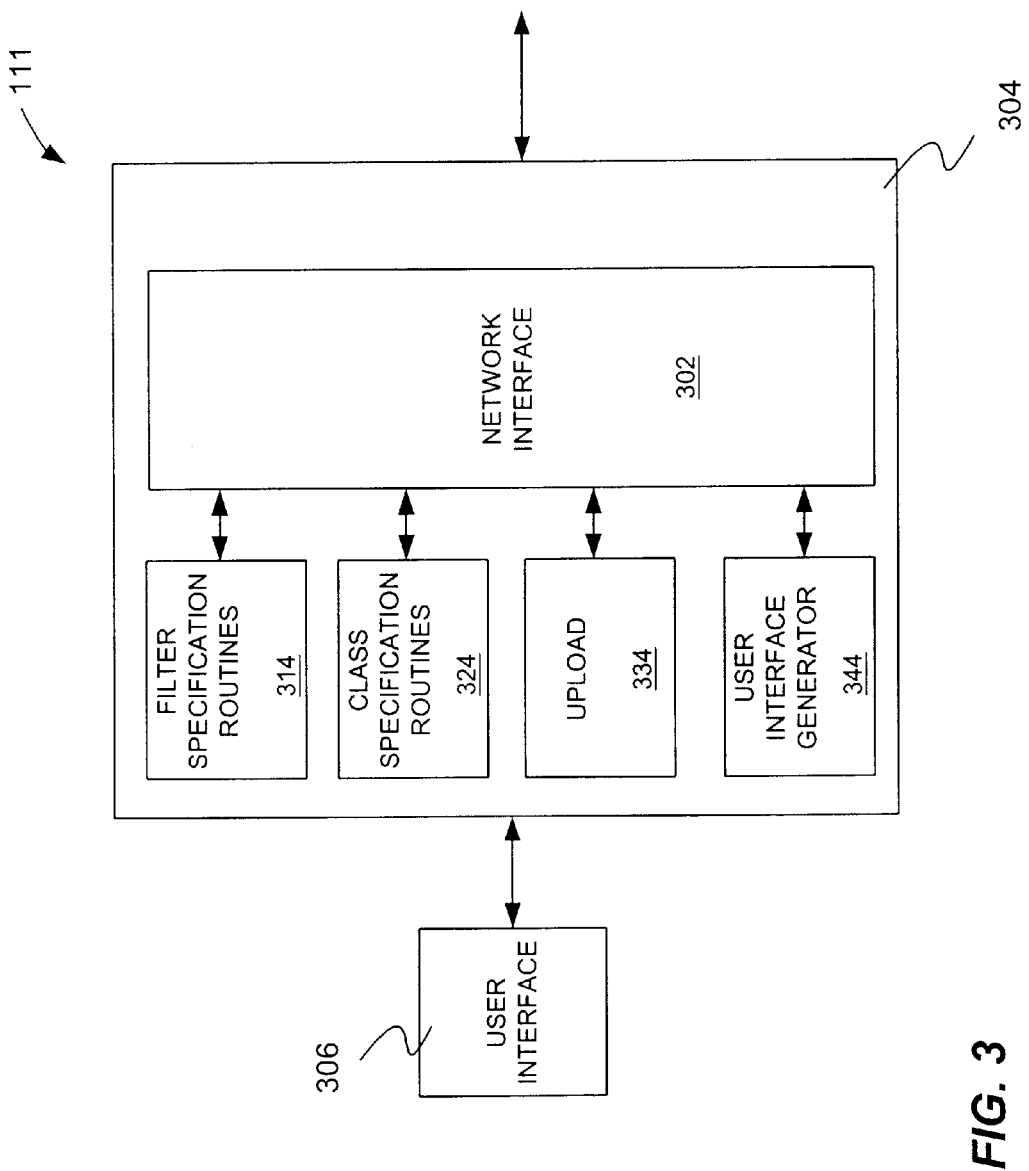
FIG. 3 shows a host analyzer in accordance with the present invention in functional block diagram form.

FIG. 3. illustrates components of host 111 in functional block-diagram form. Host 111 includes a processor 304 that is implemented by a central processing unit, memory, and auxiliary devices to provide network connectivity, mass storage, and the like. User interface components 306 may include, for example, a mouse, a keyboard, a video display, and the like. In a particular example processor 304 is implemented using a Pentium-class computer system having a network interface card and appropriate drivers providing network connectivity. Processor 304 includes sufficient memory and mass storage to store and manipulate the portions of packet buffer 208 that are downloaded for analysis. In accordance with the present invention, memory requirements for host processor may be relaxed as compared to conventional host analyzer systems as the host 111 does not need to manipulate the entire contents of a probe buffer at one time. This feature can both improve performance and reduce system costs.

Host 111 may be implemented as a workstation, personal computer, laptop computer, or other commercially available computer system. It is contemplated that host 111 may be implemented as a server that provides packet retrieval and analysis services on behalf of a client implemented in one of appliances 108 shown in FIG. 1.

Processor 304 executes stored program code to implement filter specification routines 314, class specification routines 324, upload routines 334, and user interface generator 344. Filter specification routines 314 cooperate with user interface generator 344 to provide a mechanism for a user to specify routines to be executed by filter routines component 214 (shown in FIG. 2). Similarly, class specification routines 324 cooperate with user interface generator 344 to provide a mechanism for a user to specify routines to be executed by classify routines component 224. The filter and classification routines describe the logic and variables required to discriminate between packet types, select packets having characteristics specified in the routines, and encode a class code for storage in class tracking buffer 206. In an example implementation the classification routines are downloaded from the host computer and incorporated into and executed with the filter routines 214. As a packet is placed in an entry 218 of packet buffer 208 the class code is placed in a corresponding entry 216 of class tracking buffer 206.

Upload routines 334 direct the upload of data from both the class tracking buffer 206 and packet buffer 208 of probe 107. In cooperation with user interface routines 344, upload routines 334 provide an interface 400 (shown in FIG. 4) that enables a user to select portions of the contents of packet buffer 208 for upload using the class code information. In a basic implementation upload routines 334 enable a user to select one or more ranges of entries 218 for download. In a more complex implementation, upload routines 334 contact upload routines 234 to download class code information from all or part of tracking buffer 206 prior to enabling the user to select one or more ranges of entries 218. After user selection, upload routines 334 cause upload routines 234 to upload the selected entries 218.

Figure 4:
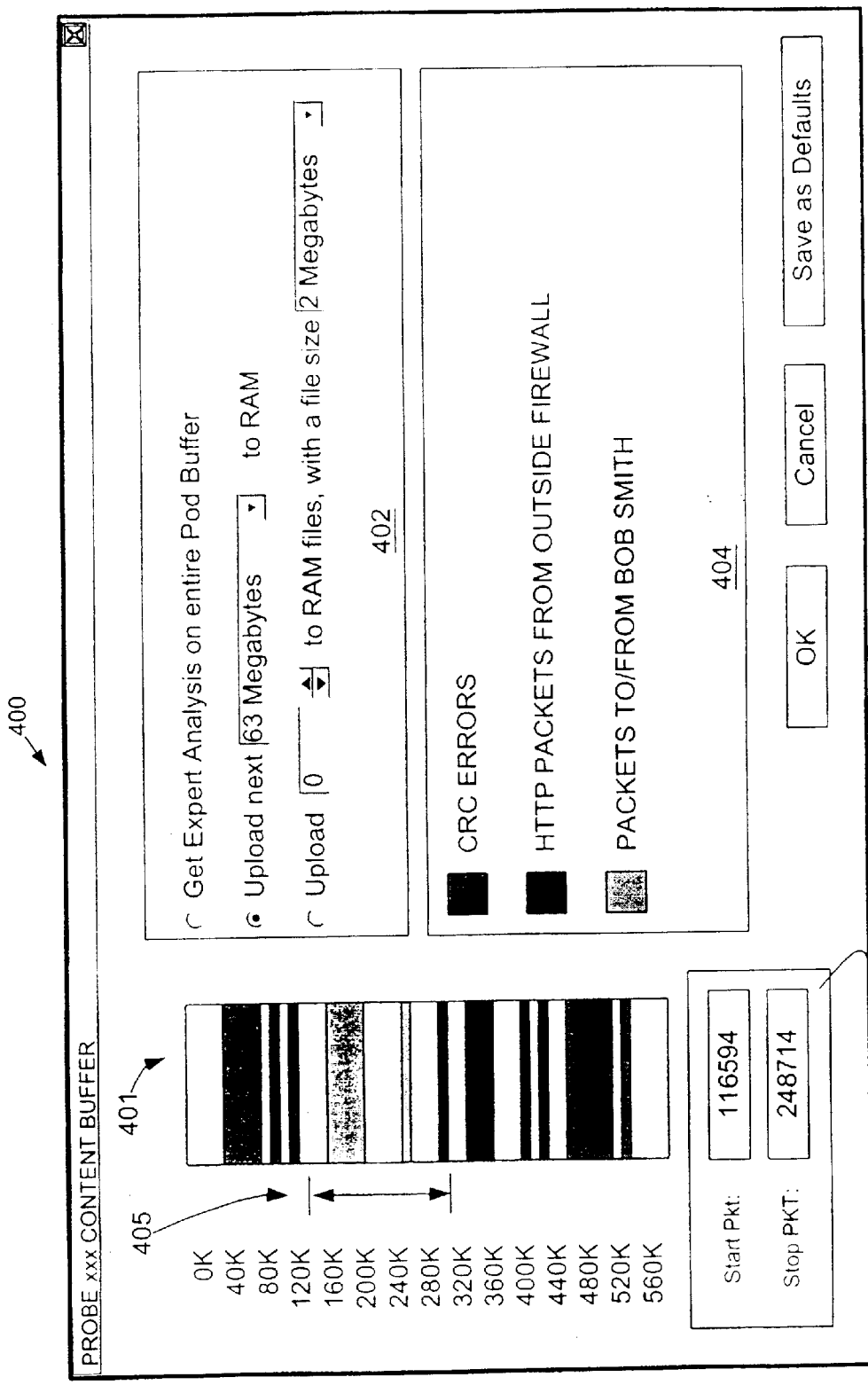
FIG. 4 illustrates an exemplary graphical interface in accordance with the present invention.

FIG. 4 illustrates an exemplary dialog box interface generated by user interface generator 344 shown in FIG. 3. The dialog box shown in FIG. 4 includes a graphical representation 401 of the probe buffer that indicates the presence of captured packets in packet buffer 208. Preferably, representation 401 includes some form of graphical depiction of the class data associated with each captured packet. In FIG. 4, class data is depicted by various patterns that can be decoded using data from key area 404. In many applications it is preferable to indicate various class types using colors and/or brightness variations that enable a user to readily distinguish between packets of different classes.

The interface shown in FIG. 4 enables a user to select portions of probe buffer 208 in a variety of ways. The example dialog box includes an area 402 for specifying portions of probe buffer 208 using text, radio button, and/or pull down box controls. For example, a user can manipulate the length of indicator 405 to select portions of the probe buffer 218 as indicated by the adjacent representation 401. Display area 403 indicates selected packets by packet number as specified by either control area 402 or indicator 405.

In this way, a network technician can quickly and readily perceive which portions of capture buffer 208 are of interest, and can download just those regions. The host computer 111 and remote probe 107 are adapted such that the network technician can easily program the sets of classes for recognition. Because the packets of interest are displayed in a visually distinct manner, the network technician can perceive groupings and patterns of network packets data of interest, and then use slider controls 405 on the graphical display to graphically select which portions of memory to download from the remote probe 107. It can be readily appreciated by a person of ordinary skill in the art that the types of classes can be recognized at remote probe, labeled, and previewed can be any of her variety of classes, although it is preferable that such classes be recognizable at a low protocol analysis level such that they can be quickly identified by the remote probe 107 as the packets come in.

In operation, a user manipulates entries in the dialog box shown in FIG. 4 to specify a start index and the size of the file or files to be uploaded. The file size may be based, for example, on the amount of buffer space or available working memory (e.g., 63 Megabytes in FIG. 4) in host 111. This ensures that host 111 will upload no more data than it can efficiently manipulate. Alternatively, the upload can be formatted into a number of smaller, easily manipulated files. Host 111 sends a request to probe 107 to return the stop packet index (shown in area 403) given the starting packet index and the size of the available working memory.

In response to the request, probe 107 calculates the stop packet index by examining the packet offset of subsequent packets to determine the largest number of packets that will fit into the buffer of host 111. Probe 107 sends the stop packet index to host 111 and user interface generator 344 visually depicts stop packet index value and the graphical depiction 401. A packet range inclusive of the start and stop packet index are then transferred from probe 107 to host 111 using an available network transfer protocol. The user is allowed to invoke the dialog box shown in FIG. 4 any number of times to upload a different set of packets.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method of gathering data from network data traffic comprising:
   monitoring data packets on the network;
   capturing at least some of the packets in a data buffer;
   classifying each captured packet according to a preselected classification system;
   marking each captured packet with an indicia of its classification;
   executing an analysis program on a network coupled computer;
   displaying data about the buffer contents using the analysis program including the indicia before transferring the buffer contents to the analysis program.

2. The method of claim 1 further comprising a step of using the indicia to create a graphical display on the analysis program describing the buffer contents.

3. The method of claim 1 further comprising
   generating user input controls on the graphical display enabling a user to designate a portion of the buffer contents; and
   downloading the designated data to the exclusion of un-designated data from the buffer to the computer executing the analysis program.

4. The method of claim 1 further comprising:
   using program devices executing on the network-coupled computer to specify the classification system by designating a class indicia for each class and specifying a procedure executable in the remote buffer for performing the classifying step.

5. A system for remote network analysis comprising:
   a remote network;
   a capture unit coupled to the remote network and operable to capture a selected set of packets from the remote network;
   a class tracking buffer in the capture unit responsive to specified classification criteria to tag each captured packet with a classification code indicating membership in one of the specified classes;
   an internetwork coupled to the remote network;
   a host computer coupled to the internetwork;
   software devices executing on the host computer and operable to retrieve data from the capture unit based upon the classification tag associated with each captured packet and analyze the retrieved data;
   display devices executing on the host computer operable to display a map of the capture packets within the capture unit along with the classification information indicating membership in a specified class.

6. The system of claim 5 further comprising display devices executing on the host computer operable to display data and analyzed data.

7. The system of claim 5 further comprising a class definition device executing in the host enabling an analyst to specify packet classification criteria.

8. A probe buffer for capturing data packets from a network comprising:
   means for coupling to a network;
   filter routines executing in the probe and operable to receive packets from the network and select packets meeting predefined criteria;

classification routines operable in cooperation with the filter routines to associate a class code with each of the selected packets;

a packet buffer having a plurality of entries where each entry is sized to hold a captured packet; and a class tracking buffer having a plurality of entries where each entry corresponds with an entry in the packet buffer and holds the class code associated with the packet held in the corresponding packet buffer.

9. The probe buffer of claim 8 wherein the filter routines are specified by an external host analysis computer.

10. The probe buffer of claim 8 wherein the classification routines are specified by an external host analysis computer.

11. The probe buffer of claim 8 further comprising upload routines executing on the probe buffer and configured to receive a request from an external host analysis computer, wherein the request specifies a starting packet index and a host buffer size and the upload routines are configured to respond to the request with an indication of a last packet from the packet buffer such that a packet range extending from the start packet to the last packet will fit into the host buffer.

12. The probe buffer of claim 11 wherein the upload routines include means for uploading the packet range to the external host analysis computer.

13. A probe analysis computer for analyzing data packets from a network comprising:

means for coupling to a network;

a buffer memory sized to hold a number of data packets during an analysis session;

filter specification routines executing in the probe analysis computer and operable to specify predefined packet selection criteria and operable to specify predetermined packet selection criteria and operable to communicate the packet selection criteria to a remote probe;

class specification routines executing in the probe analysis computer and operable to specify one or more packet classes and operable to communicate the class specification to the remote probe; and upload routines executing in the probe analysis computer and operable to generate a request specifying a start packet index and the buffer memory size to the remote probe.

14. The probe analysis computer of claim 13 wherein the upload routines receive a response to the request, the response indicating a stop packet index.

15. The probe analysis computer of claim 13 wherein the upload routines generate a preliminary request for probe descriptor data and in response to the preliminary request receive probe descriptor data from a remote probe.

16. The probe analysis computer of claim 15 further comprising a graphical user interface including elements graphically depicting a representation of a probe buffer using the probe descriptor data.

* * * * *